United States Patent [19]
Urushiyama et al.

[11] Patent Number: 6,012,333
[45] Date of Patent: Jan. 11, 2000

[54] VIBRATION CONTROL DEVICE FOR ROTATING OBJECTS

[75] Inventors: Yuta Urushiyama; Yasuharu Hontani; Satoru Kawabe, all of Wako, Japan

[73] Assignee: Honda Giken Kogyo Kabushiki Kaisha, Tokyo, Japan

[21] Appl. No.: 09/074,560

[22] Filed: May 7, 1998

[30] Foreign Application Priority Data

May 9, 1997 [JP] Japan ................................. 9-119239

[51] Int. Cl.$^7$ ............................. G01H 1/00; G01P 15/00
[52] U.S. Cl. ........................................... 73/579; 73/514.17
[58] Field of Search ............................. 73/576, 579, 664, 73/496, 510, 514.16, 514.17, 514.34

[56] References Cited

U.S. PATENT DOCUMENTS

| | | | |
|---|---|---|---|
| 4,462,254 | 7/1984 | Rider | 73/510 |
| 4,950,966 | 8/1990 | Moulds, III | 318/561 |
| 5,369,348 | 11/1994 | Gennesseaux | 318/623 |
| 5,503,043 | 4/1996 | Olbrich | 74/574 |
| 5,504,381 | 4/1996 | Kato | 310/51 |

*Primary Examiner*—Max Noori
*Attorney, Agent, or Firm*—Skjerven, Morrill, Macpherson, Franklin & Friel LLP; Alan H. MacPherson

[57] ABSTRACT

The vibration control device comprises an electromechanical transducer module adapted to be attached to an outer surface of a rotating object, and a control circuit for electrically controlling an internal stress of the electromechanical transducer module so that the internal stress counteracts a stress of the rotating object resulting from a vibration of the object that is desired to be controlled. Thus, the stress produced from the vibration of the rotating object is transmitted to the electromechanical transducer module, and is converted into an electric energy. The electric energy thus produced by the vibration of the rotating object is applied to the electromechanical transducer module, and is thereby converted into an internal stress of the electromechanical transducer module which counteracts the vibration of the rotating object. Therefore, the rigidity of the rotating object against vibration can be increased in effect, and, in particular, the resonant vibration of the rotating object can be effectively controlled as well as other vibrations of the rotating object arising from various sources.

14 Claims, 6 Drawing Sheets

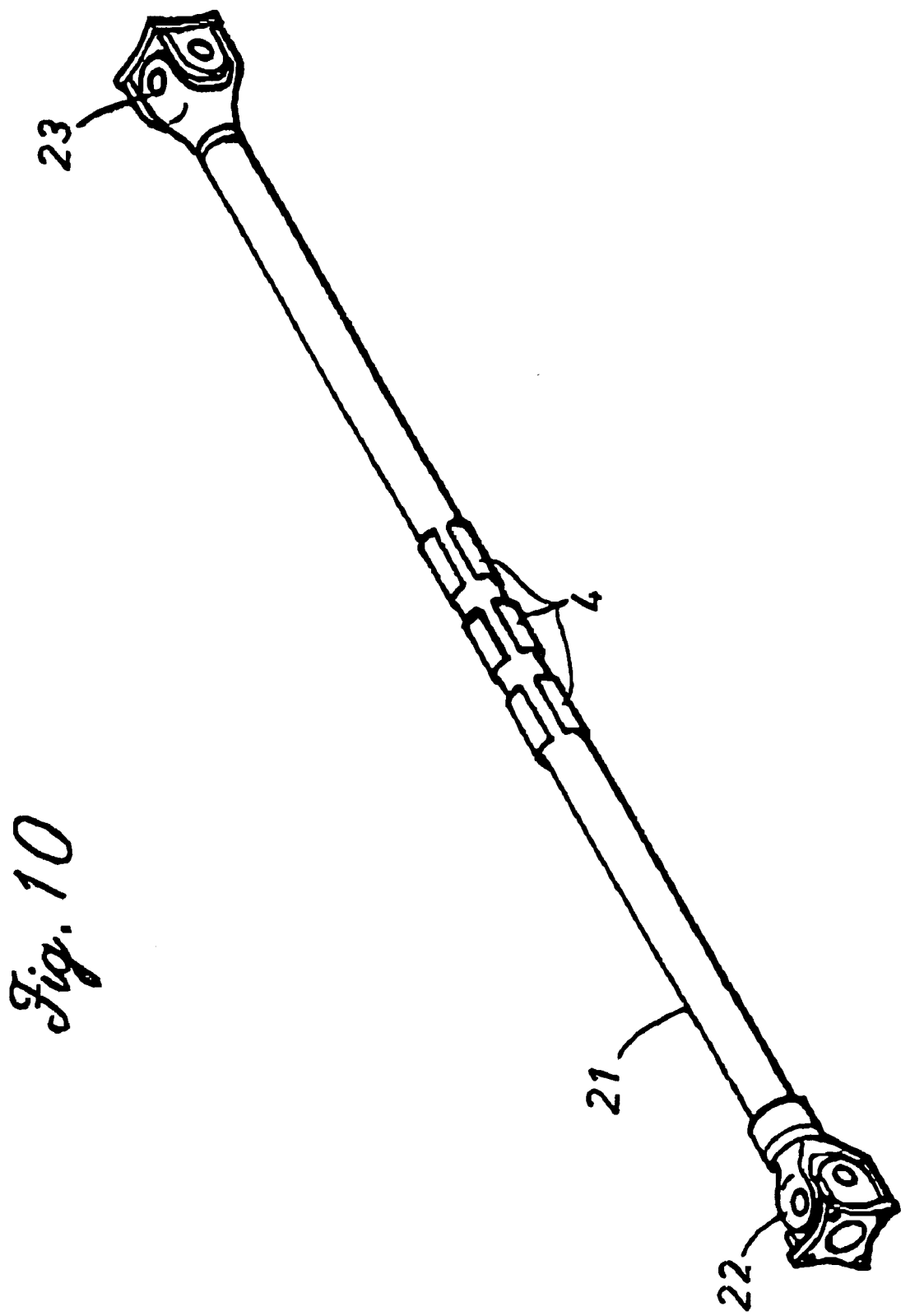

VIBRATION CONTROL DEVICE FOR ROTATING OBJECTS

TECHNICAL FIELD

The present invention relates to a vibration control device which is suitable for controlling the vibrations of rotating objects such as drive shafts and propeller shafts.

BACKGROUND OF THE INVENTION

Various vibration control measures have been taken for power transmission shafts for transmitting power from engines. For instance, the drive shaft may be equipped with a dynamic damper consisting of a spring and mass system attached to the drive shaft which is tuned to the frequency of the vibration of the drive shaft which is desired to be controlled. The dynamic damper changes the resonance property of the drive shaft so as to suppress the oscillation level at the original resonance frequency of the drive shaft. With the aim of suppressing the resonant vibration of the drive shaft, the drive shaft may be divided into two segments each of which are separately supported by the vehicle body. By thus reducing the span of the drive shaft, the resonance frequency of each span is raised, in some cases, well above the frequency of the vibration induced by the rotation of the drive shaft.

However, a dynamic damper requires a substantial mounting space, and adds to the mass of the drive shaft. Also, when the resonance frequency of the drive shaft is relatively low, the spring constant of the spring member of the dynamic damper is required to be so reduced that the durability of the dynamic damper could be impaired. When the drive shaft is divided into two segments, a bearing arrangement has to be provided for each segment, and this requires an increase in the number of required component parts such as a coupling and bearings. In either case, the rotating objects have to be balanced for rotation after these measures are taken, and this adds to the cost and labor required for assembling the motor vehicles.

BRIEF SUMMARY OF THE INVENTION

In view of such problems of the prior art, a primary object of the present invention is to provide a vibration control device for rotating objects which requires very little mounting space and would not substantially increase the number of required component parts.

A second object of the present invention is to provide a vibration control device for rotating objects which is effective in increasing the effective rigidity of a rotating object against vibration, and controlling undesired vibration of the rotating object.

A third object of the present invention is to provide a vibration control device for rotating objects which would not substantially increase the mass of the rotating object.

According to the present invention, these and other objects can be accomplished by providing a vibration control device for rotating objects, comprising: an electromechanical transducer module adapted to be attached to an outer surface of a rotating object; and a control circuit for electrically controlling an internal stress of the electromechanical transducer module so that the internal stress counteracts a stress of the rotating object resulting from a vibration of the object that is desired to be controlled.

Thus, the stress produced from the vibration of the rotating object is transmitted to the electromechanical transducer module, and is converted into an electric energy. The electric energy thus produced by the vibration of the rotating object is applied to the electromechanical transducer module, and is thereby converted into an internal stress of the electromechanical transducer module which counteracts the vibration of the rotating object. Therefore, the rigidity of the rotating object against vibration can be increased in effect, and, in particular, the resonant vibration of the rotating object can be effectively controlled as well as other vibrations of the rotating object arising from various sources. By applying the present invention to a rotating shaft, it becomes possible to rotate the shaft at its critical speed without creating any problem. The electromechanical transducer module typically consists of a piezoelectric transducer element such as PZT (piezoelectric lead zirconate titanate), PLZT (piezoelectric lead lanthanum zirconate titanate), PMN (piezoelectric lead magnesium niobate) and PVDF (piezoelectric polyvinylidene fluoride).

In particular, when the control circuit consists of a passive analog resonance circuit tuned to a resonance frequency of the object which is desired to be controlled, it becomes possible to integrally incorporate the control circuit in the electromechanical transducer module, and control the vibration of the rotating object without requiring any lead wire extending out of the vibration control device. Therefore, the device is both simple and economical to implement, and would not substantially increase the mass of the rotating object.

According to a preferred embodiment of the present invention, the electromechanical transducer module comprises a planar piezoelectric transducer, a pair of layers of electrodes interposing the piezoelectric transducer therebetween, a planar analog resonance circuit disposed adjacent to the piezoelectric transducer, and a package encapsulating the piezoelectric transducer, the electrodes, and the analog resonance circuit integrally therein. Therefore, the device can be used as a self-sufficient device which can be freely applied to desired places, and is protected from elements so as to be safely used in various harsh environments such as the underside of motor vehicles over extended periods of time.

If a large amount of electric energy is required to control the vibration of the rotating object, the control circuit may comprise an amplifier which is powered by a power source to apply external electric energy to the electromechanical transducer module.

BRIEF DESCRIPTION OF THE DRAWINGS

Now the present invention is described in the following with reference to the appended drawings, in which:

FIG. 10 is a perspective view of a propeller shaft to which the present invention is applied.

DETAILED DESCRIPTION OF THE PREFERRED EMBODIMENTS

Figure 1:
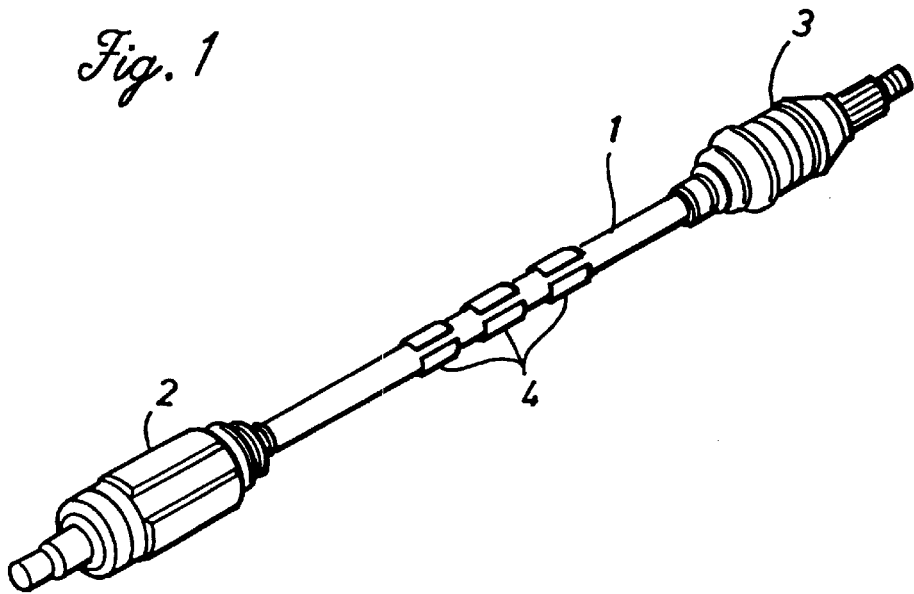
FIG. 1 is a perspective view showing a drive shaft to which the present invention is applied.

FIG. 1 illustrates a drive shaft for a front-engine front-drive motor vehicle to which the present invention is applied. This drive shaft 1 is connected to a differential device (not shown in the drawing) at its one end via an inboard joint 2 and to a wheel hub (not shown in the drawing) at its other end via an outboard joint 3. A plurality of electromechanical transducer modules 4 are attached to the outer circumferential surface of an axially middle part thereof. In this case, there are three groups of electromechanical transducer modules 4 which are arranged in an axially spaced relationship, and each group includes a pair of electromechanical transducer modules 4 each of which extends slightly less than 180 degrees.

Figure 2:
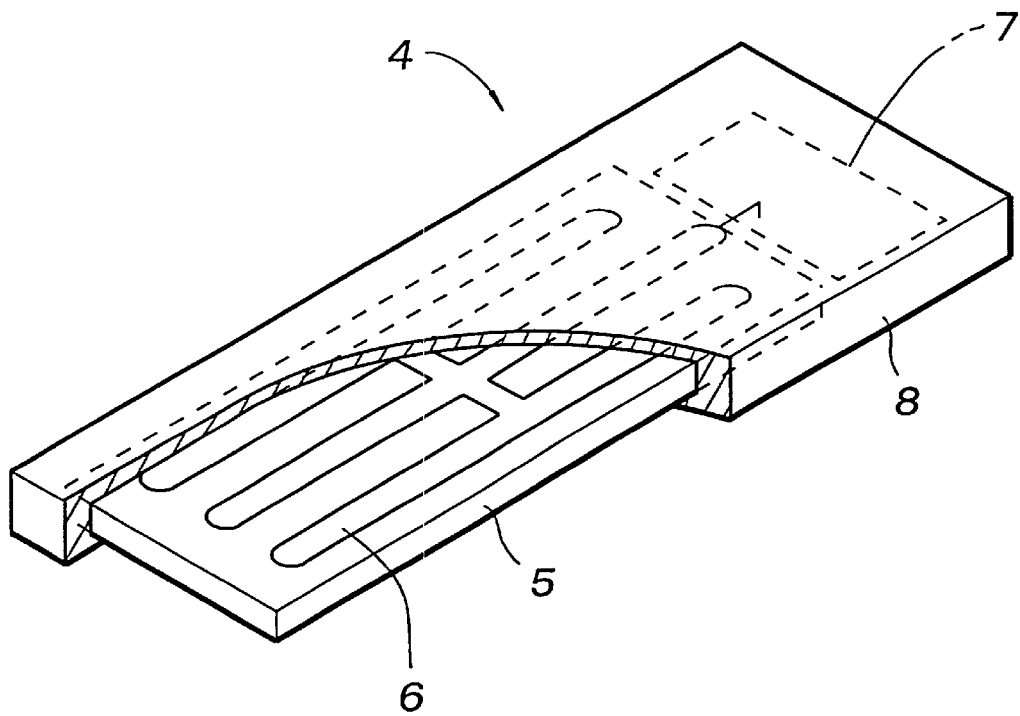
FIG. 2 is a partly broken away perspective view showing a electromechanical transducer module embodying the present invention.
Figure 3:
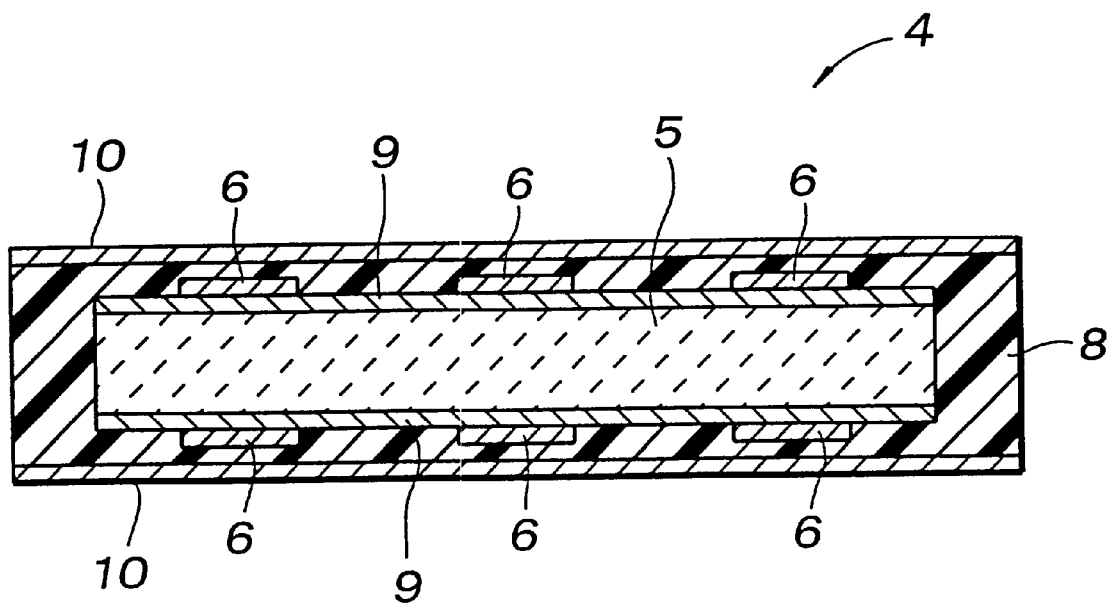
FIG. 3 is a sectional view of the electromechanical transducer module of FIG. 2.

Each electromechanical transducer module 4 is adapted to produce an electric voltage according to the stress applied thereto, and to produce a stress according to the electric voltage applied thereto. Referring to FIG. 2, the electromechanical transducer module 4 comprises a piezoelectric transducer element 5 consisting of PZT or the like formed as a rectangular plate, a pair of copper electrodes 6 placed over the front and reverse surface of the piezoelectric transducer element 5, a control circuit 7 electrically connected to the copper electrodes 6, and an epoxy package 8 encapsulating the piezoelectric transducer element 5, the copper electrodes 6, and the control circuit 7 therein through a thermal curing process. Referring to FIG. 3, an electroconductive sheet 9 containing Ni is interposed between the piezoelectric transducer element 5 and each of the copper electrodes 6, and the two sides of the epoxy package 8 are covered by polyimide film 10.

Figure 4:
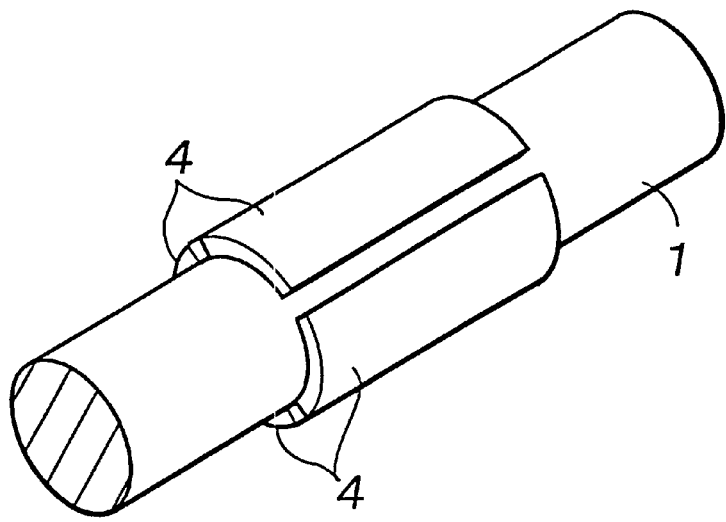
FIG. 4 is an enlarged perspective view showing electromechanical transducer modules which are attached to a drive shaft for the purpose of controlling the bending vibration thereof.

Each electromechanical transducer module 4 is suitably curved as illustrated in FIG. 4 to conform to the outer circumferential surface of the drive shaft 1, and the longitudinal axis of the electromechanical transducer module 4 is aligned with the axial direction of the drive shaft 1 as illustrated in FIG. 4.

Figure 5:
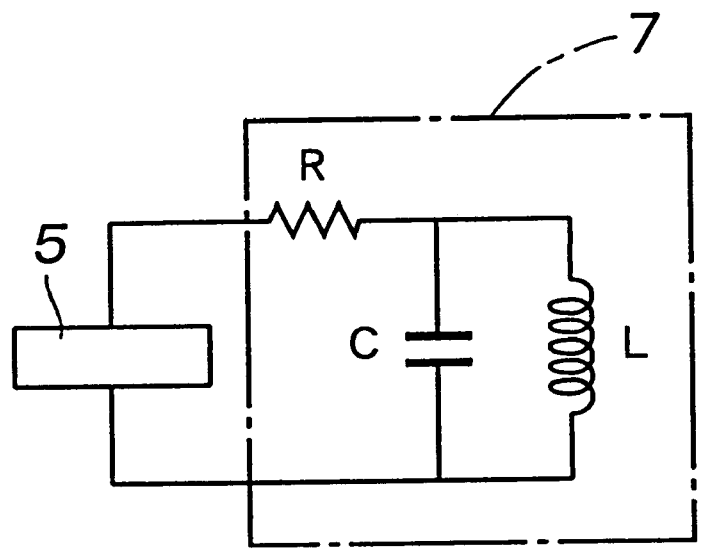
FIG. 5 is a circuit diagram of a resonance circuit which may be used as the control circuit incorporated in the electromechanical transducer module of FIG. 2.
Figure 6:
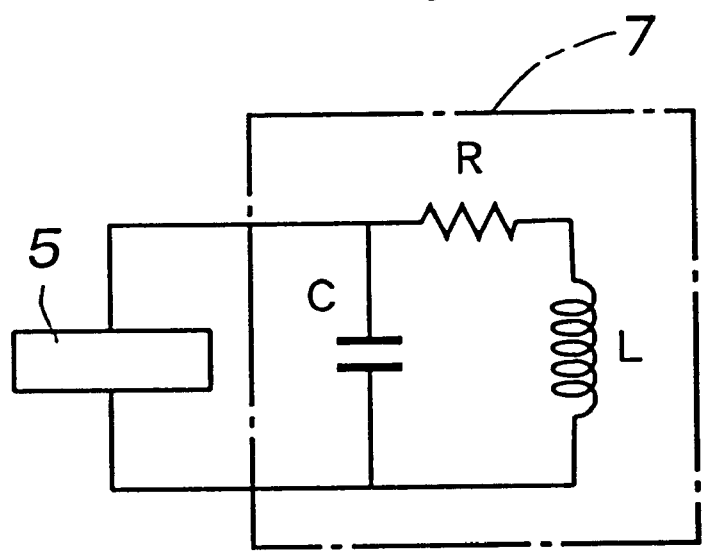
FIG. 6 is a circuit of another resonance circuit which may be used as the control circuit incorporated in the electromechanical transducer module of FIG. 2.

The control circuit 7 essentially consists of an analog resonance circuit which is tuned to the resonance frequency of the bending vibration of the drive shaft 1. This circuit may be formed by connecting a capacitor C and a coil L in parallel, and connecting a resistor R in series with this parallel circuit as illustrated in FIG. 5. Alternatively, the circuit may be formed by connecting a coil L and resistor R in series, and connecting a capacitor C in parallel with the series circuit as illustrated in FIG. 6.

Now the mode of operation of this arrangement is described in the following. When the drive shaft 1 undergoes a bending vibration, a cyclic stress is produced in the piezoelectric transducer element 5 of each electromechanical transducer module 4. As well known in the art, this stress alternates between compression and tension at the frequency of the bending vibration of the drive shaft 1. This in turn causes a cyclic voltage to be supplied from the piezoelectric transducer element 5 to the control circuit 7. Therefore, when the drive shaft 1 vibrates at its resonance frequency, the control circuit 7 produces electric energy having such a voltage, frequency and phase relationship as to produce a stress which counteracts the bending vibration of the drive shaft 1.

Figure 7:
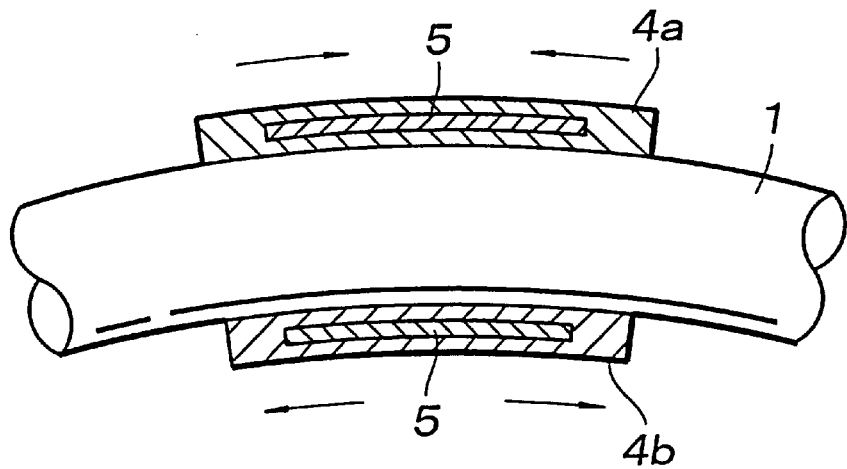
FIG. 7 is a schematic sectional view illustrating the operation of the electromechanical transducer modules in controlling the bending vibration of the drive shaft.

For instance, when the drive shaft 1 has deflected to the position illustrated in FIG. 7 during a resonant vibration of the drive shaft 1, the piezoelectric transducer element 5 of the electromechanical transducer module 4a which is placed under tension produces a compressive stress as indicated by the arrows while the piezoelectric transducer element 5 of the electromechanical transducer module 4b which is placed under compression produces a tensile stress as indicated by the arrows. When the drive shaft 1 has deflected in the opposite direction, the electromechanical transducer modules 4a and 4b produce stresses in the opposite directions. In other words, the internal stresses which are produced in the piezoelectric transducer elements 5 oppose the deformation of the drive shaft 1, and this increases the bending rigidity of the drive shaft 1 in effect.

Figure 8:
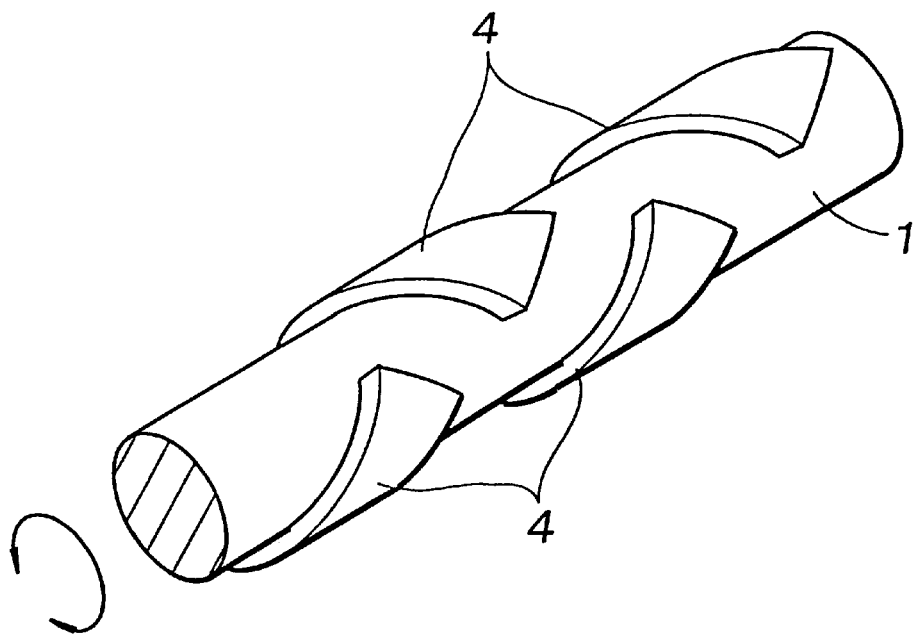
FIG. 8 is an enlarged perspective view showing electromechanical transducer modules which are attached to a drive shaft for the purpose of controlling the torsional vibration thereof.

The above described embodiment was directed to the control of the bending vibration of a drive shaft 1, but it is also possible to apply the present invention to control the twisting vibration of the drive shaft 1. In this case, the electromechanical transducer modules 4 are arranged on the outer circumferential surface of the drive shaft along spiral lines as illustrated in FIG. 8. In other words, the axial line of each electromechanical transducer module 4 defines a certain angle with respect to the central axial line of the drive shaft 1. In this case also, the piezoelectric transducer element 5 of each electromechanical transducer module 4 produces an internal stress which opposes the torsional vibration of the drive shaft 1, in particular at the resonant torsional vibration of the drive shaft 1.

The control circuits 7 for the above described embodiments consisted of passive analog circuits, but it is also possible to use active circuits for more positive control of the vibrations of various members. In the embodiment illustrated in FIG. 9, a vibration sensor 11 which may consist of an piezoelectric transducer element such as a piezoelectric element is attached to a drive shaft 1 in addition to electromechanical transducer modules 4 similar to those of the previously described embodiments. The output from this vibration sensor 11 is processed by a control circuit 12 to obtain the amplitude and frequency of the vibration of the drive shaft 1, and the control circuit 12 additionally produces, in cooperation with a battery 13 and an amplifier 14, electric energy having such a voltage, frequency and phase relationship which counteract and cancel the existing vibration of the drive shaft 1. According to this arrangement, the frequency of the voltage applied to the piezoelectric transducer element 5 of each electromechanical transducer module 4 can be selected at will depending on the frequency and amplitude of the vibration of the drive shaft 1 so that a wider range of vibrations of the drive shaft 1 can be controlled. For instance, this arrangement may be applied to the prevention of transmission of low frequency vibrations over the drive shaft 1 which has been known to be highly difficult to control with conventional methods. Also, by increasing the electric energy for actuating the electromechanical transducer modules 4, it becomes possible to control more powerful vibrations in a more positive way.

Figure 9:
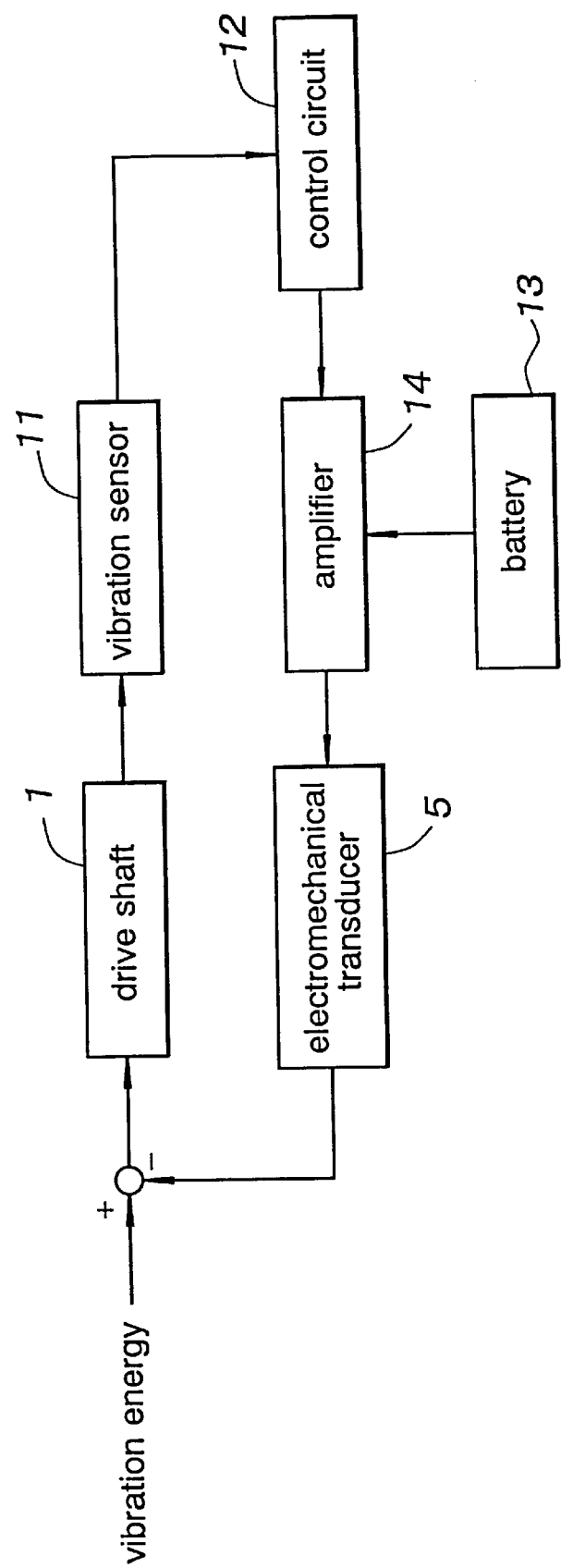
FIG. 9 is a block diagram showing a control circuit which is constructed as an active circuit capable of applying external electric energy to the electromechanical transducer modules.

FIG. 10 illustrates an embodiment of the present invention which is applied to a propeller shaft 21 which extends from a front part of a vehicle to a rear part thereof. This propeller shaft 21 is connected to a transmission and a differential device (which are not shown in the drawing) at respective ends thereof via universal joints 22 and 23, respectively. A plurality of electromechanical transducer modules 4 are attached to an axially middle part of the drive shaft 21. In this case also, the electromechanical transducer modules 4 should be arranged along the axial lines of the propeller shaft 21 (as illustrated in FIG. 4) when the bending vibrations of the propeller shaft 21 are desired to be controlled, and along spiral lines on the outer circumferential surface of the propeller shaft 21 (as illustrated in FIG. 9) when the twisting vibrations of the propeller shaft 21 are desired to be controlled.

The above described embodiments were applied to drive shafts 1 and propeller shafts 21, but there are given only as examples, and the present invention can be applied to virtually any vibrating objects as long as the objects allow the electromechanical transducer modules to be attached thereto. In particular, the present invention is suited to be applied to rotating objects such as power transmission shafts of power trains for engines. When the control circuit consists of a passive circuit, no lead wires are required for the electromechanical transducer modules. If an active circuit is used, it may be necessary to electrically connect the electromechanical transducer modules to external circuits by using slip rings or the like.

The vibrations which are desired to be controlled may consist of whirling movements of rotating shafts and bending and twisting vibrations of rotating shafts which may be induced by the vibrations of the engines, imbalance of the rotating objects or other sources. This invention is also effective in controlling self-induced vibrations of various kinds.

Although the present invention has been described in terms of a preferred embodiment thereof, it is obvious to a person skilled in the art that various alterations and modifications are possible without departing from the scope of the present invention which is set forth in the appended claims.

What we claim is:

1. A device for controlling the vibration of a rotating object, the rotating object producing a vibrational stress, the device comprising:

an electromechanical transducer module adapted to be attached to an outer surface of the rotating object, said electromechanical transducer module having an internal stress; and a control circuit electrically coupled to said electromechanical transducer module, the control circuit controlling said internal stress of said electromechanical transducer module so that said internal stress counteracts the vibrational stress of the rotating object to stabilize the rotating object.

2. A device according to claim 1, wherein said electromechanical transducer module comprises a piezoelectric transducer element.

3. A device according to claim 1, wherein said control circuit comprises an analog resonance circuit tuned to a resonance frequency of the rotating object.

4. A device according to claim 3, wherein said analog resonance circuit is integrally incorporated in said electromechanical transducer module.

5. A device according to claim 4, wherein said electromechanical transducer module comprises a planar piezoelectric transducer element, a pair of layers of electrodes interposing said piezoelectric transducer element therebetween, a planar analog resonance circuit disposed adjacent to said piezoelectric transducer element, and a package encapsulating said piezoelectric transducer element, said electrodes, and said analog resonance circuit integrally therein.

6. A device according to claim 1, wherein said control circuit comprises an amplifier which is powered by a power source to apply external electric energy to said electromechanical transducer module.

7. A device for controlling the vibration of a rotating object, the rotating object having an outer circumferential surface and an axis of rotation and producing a vibrational stress, the device comprising:

an electromechanical transducer module having a longitudinal line, said electromechanical transducer module adapted to be attached to the outer circumferential surface of the rotating object such that the longitudinal line of the module extends along the outer circumferential surface of the rotating object, said electromechanical transducer module having an internal stress; and a control circuit electrically coupled to said electromechanical transducer module, the control circuit controlling said internal stress of said electromechanical transducer module so that said internal stress counteracts the vibrational stress of the rotating object to stabilize the rotating object.

8. A device according to claim 7, wherein said electromechanical transducer module comprises a piezoelectric transducer element.

9. A device according to claim 7, wherein said control circuit comprises an analog resonance circuit tuned to a resonance frequency of the rotating object.

10. A device according to claim 9, wherein said analog resonance circuit is integrally incorporated in said electromechanical transducer module.

11. A device according to claim 10, wherein said electromechanical transducer module comprises a planar piezoelectric transducer element, a pair of layers of electrodes interposing said piezoelectric transducer element therebetween, a planar analog resonance circuit disposed adjacent to said piezoelectric transducer element, and a package encapsulating said piezoelectric transducer element, said electrodes, and said analog resonance circuit integrally therein.

12. A device according to claim 7, wherein said control circuit comprises an amplifier which is powered by a power source to apply external electric energy to said electromechanical transducer module.

13. A device according to claim 7, wherein the longitudinal line of the electromechanical transducer module extends parallel to the axis of rotation of the rotating body when the module is attached to the rotating object, and wherein the control circuit controls the internal stress of said module so that the internal stress counteracts a vibrational bending stress of the rotating object.

14. A device according to claim 7, wherein the longitudinal line of the electromechanical transducer module extends at an angle with respect to the axis of rotation of the rotating body when the module is attached to the rotating object, and wherein the control circuit controls the internal stress of said module so that the internal stress counteracts a vibrational twisting stress of the rotating object.

* * * * *